United States Patent [19]

Lassiaz et al.

[11] Patent Number: 4,646,901
[45] Date of Patent: Mar. 3, 1987

[54] CLUTCH RELEASE BEARING ESPECIALLY FOR A MOTOR VEHICLE

[75] Inventors: Philippe Lassiaz, Boulogne; Bernard Mallet, Wittelsheim, both of France

[73] Assignee: Valeo, Paris, France

[21] Appl. No.: 599,148

[22] Filed: Apr. 11, 1984

[30] Foreign Application Priority Data

Apr. 11, 1983 [FR] France .................................. 83 05851

[51] Int. Cl.⁴ .............................................. F16D 13/71
[52] U.S. Cl. ............................... 192/109 A; 192/89 B; 192/109 B
[58] Field of Search ................... 192/98, 110 B, 89 B, 192/99 A, 109 A, 109 B; 308/233, 235, 236

[56] References Cited

U.S. PATENT DOCUMENTS

| 3,323,624 | 6/1967 | Maurice | 192/89 B |
| 3,868,006 | 2/1975 | Linn et al. | 192/891 |
| 3,973,659 | 8/1976 | Ernst et al. | 192/98 |
| 4,084,674 | 4/1978 | de Gennes | 192/89 B |
| 4,159,052 | 6/1979 | Ernst et al. | 192/98 |
| 4,228,882 | 10/1980 | Huber et al. | 192/89 B |
| 4,456,111 | 6/1984 | Limbacher | 192/98 |

FOREIGN PATENT DOCUMENTS

| 2304826 | 10/1976 | France | 192/89 B |
| 2454386 | 11/1980 | France . | |
| 1390092 | 5/1972 | United Kingdom | 192/98 |

Primary Examiner—Samuel Scott
Assistant Examiner—H. A. Odar
Attorney, Agent, or Firm—Young & Thompson

[57] ABSTRACT

The diaphragm spring of a clutch is connected in traction to the release bearing thereof by means of a gripping device comprising a collar held against the diaphragm spring by means of an annular resilient washer. By virtue of the contorted cross-sectional shape of the washer it provides the necessary elastic action whilst allowing a reduction in bulk.

9 Claims, 3 Drawing Figures

CLUTCH RELEASE BEARING ESPECIALLY FOR A MOTOR VEHICLE

BACKGROUND OF THE INVENTION

The present invention relates, in general terms, to clutch release bearings, especially for a motor vehicle.

It is aimed more particularly at those clutch release bearings, referred to as "pulled" bearings, which are intended to act by traction on the device, such as a diaphragm, for disengaging the clutch to be controlled, and which are coupled to this disengaging device for this purpose. Such pulled bearings are, for example, of the type described in French Patent No. 75/08,514 of the Applicant, published under No. 2,304,826.

The present invention relates, in particular, to a clutch release bearing, suitable for a motor vehicle, of the pulled type, coupled to the clutch disengaging device, such as a diaphragm, a gripping piece being attached to the said disengaging device and incorporating axially, on the side of the said disengaging device opposite to the clutch release bearing, a bearing collar for acting on the disengaging device, fixing means provided radially between the clutch release bearing and the gripping piece, being designed to make an axial connection in traction between the gripping piece and the clutch release bearing in the axial direction extending, from the front towards the rear, from the disengaging device to the clutch release bearing, and elastic retention means located on the same side as the clutch release bearing stressing the bearing collar of the gripping piece permanently into contact with the disengaging device.

In clutch release bearings proposed hitherto, these elastic retention means, however effective they may be, are bulky and make production more complicated, whilst substantially increasing the cost price.

The object of the present invention is a clutch release bearing of the kind mentioned above, which is free of these disadvantages and the elastic retention means of which make it possible to achieve an extremely reduced bulk, especially in an axial direction, together with a simple and robust construction, low inertia, particularly convenient assembly conditions and a moderate cost price.

SUMMARY

According to the invention, a clutch release bearing of the kind mentioned above is characterised in that the elastic retention means comprise at least one elastic washer, the cross-section of which has a contorted shape and which incorporates a first annular bearing surface bearing on the disengaging device and a second annular bearing surface bearing against the gripping piece, the said elastic washer having between these two annular bearing surfaces a curved zone which has a first part adjacent to the first bearing surface and inclined towards the axis and towards the rear and a second part adjacent to the second bearing surface and deflected towards the axis and towards the front.

As a result of the contorted shape of the elastic washer and because it is deflected towards the front in the vicinity of its bearing surface against the clutch release bearing, the bulk of the bearing, especially in an axial direction, is reduced considerably. Furthermore, the elastic washer works under excellent conditions which make it possible to maintain good contact between the bearing collar and the disengaging device, such as a diaphragm, even after the assembly as a whole has experienced wear.

In a preferred embodiment, the second part of the elastic washer, which is adjacent to the second bearing surface bearing against the gripping piece, is not only deflected towards the axis and towards the front, but advantageously has the form of a basket handle. Such a form makes it possible to pass round the disengaging device in an extremely practical way and offers the advantage of excellent bearing conditions together with an especially compact and concentrated construction.

Preferably, the two annular bearing surfaces of the elastic washer which bear against the diaphragm and against the gripping piece are substantially coplanar in a plane perpendicular to the axis. Thus, the device has excellent qualities of robustness for assembly purposes, but also the bulk is reduced as much as possible, whilst ensuring a very low inertia which is especially advantageous for a drawn bearing.

According to another characteristic, the elastic washer has, on the outside of the first bearing surface acting against the disengaging device, a third part which is peripheral and which is inclined outwards and towards the rear. In this way, the elastic washer has, as well as a low bulk, high performances in terms of elasticity and particularly in terms of rigidity which are appropriate for the intended assembly under excellent conditions.

In one embodiment, the elastic washer consists of a split circlip. This makes it possible to carry out assembly extremely easily and with a high degree of accuracy in spite of the compact construction and the saving in terms of bulk, especially in an axial direction, which were mentioned above.

The elastic retention means preferably comprise not only the elastic washer just described, but also an elastic counter-washer which bears on the clutch release bearing and which exerts a forward pressure on the said elastic washer at the level of the first bearing surface of this washer which bears on the disengaging device.

By means of this arrangement, permanent contact between the bearing collar of the gripping piece and the disengaging device is ensured very effectively, without any risk during operation. It should be noted that the elastic counter-washer opposes the opening of the split circlip.

DETAILED DESCRIPTION OF THE PREFERRED EMBODIMENTS

Figure 1:
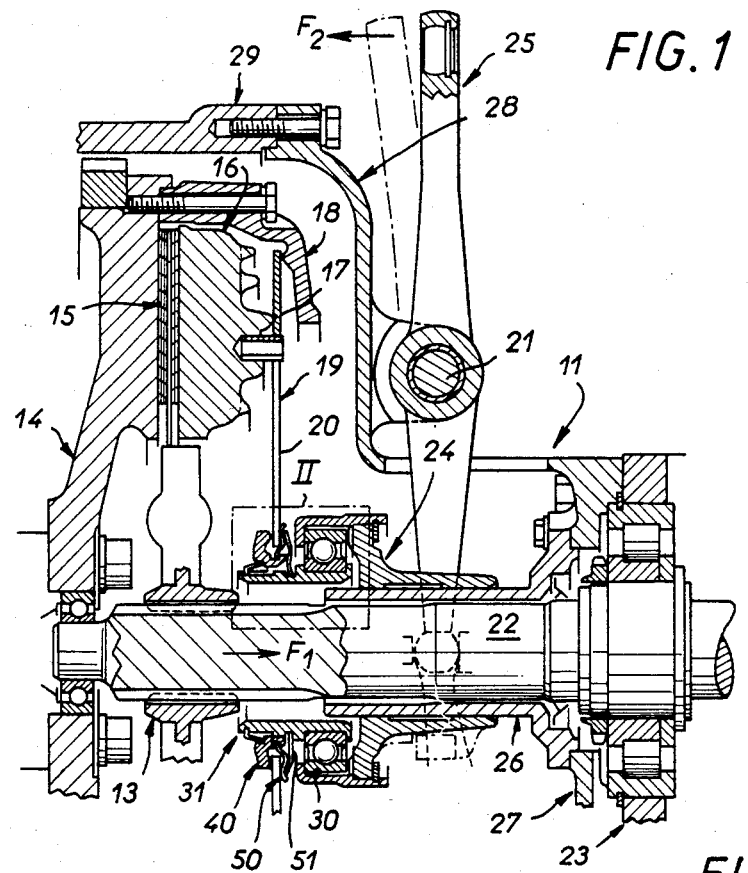
FIG. 1 is a diagrammatic sectional view of a clutch equipped with a clutch release bearing according to the invention.
Figure 3:
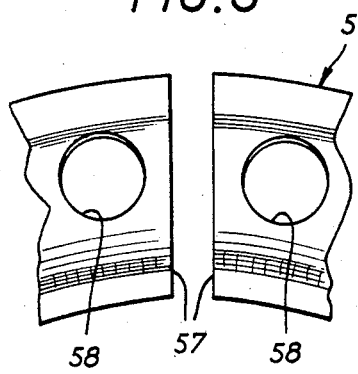
FIG. 3 is a partical view of the elastic retention washer only, according to the arrow III of FIG. 2.
Figure 2:
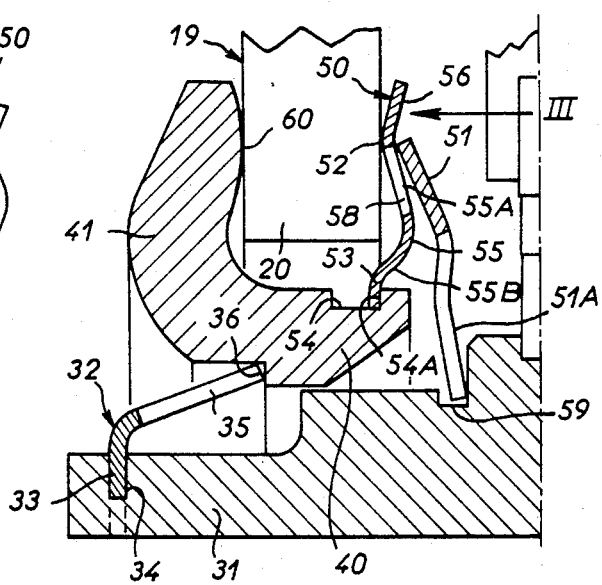
FIG. 2 is a view on a larger scale of the inset II of FIG. 1.

The embodiment illustrated in FIGS. 1 to 3 relates by way of example only to the use of the invention with a clutch release bearing of the pulled type for the clutch of the motor vehicle. This bearing is designed by 24 in FIG. 1.

14 denotes the engine flywheel forming a reaction plate for the clutch, and 13 denotes a hub for a friction disc 15. The latter is stressed in the direction of the reaction plate 14 by a pressure plate 16 mounted so as to be moveable axially, whilst being integral with the flywheel 14 in terms of rotation. The pressure plate 16 is subjected to elastic means 17 which bear on a cover 18 integral with the flywheel 14 in terms of rotation.

In the example illustrated, the elastic means 17 consist of the peripheral part, in the form of a Belleville washer, of a diaphragm 19, the central part of which forms a plurality of radial fingers 20 which together constitute a control member which, when subjected to axial traction, that is to say a force exerted axially in the opposite direction to the flywheel 14 according to the arrow F1 in FIG. 1, is designed to control the release of the clamping force exerted on the friction disc 15 by the Belleville washer 17 and the pressure plate 16 and consequently the disengagement of the hub 13 carrying the disc 15 facing the flywheel 14.

The diaphragm 19 thus constitutes not only the spring 17 of the clutch, but also a device 20 for disengaging this clutch.

22 denotes the input shaft of a gear box 23, and 24 denotes the clutch release bearing of the pulled type which is mounted so as to be axially moveable about the shaft 22 under the control of a rocking control member 25, commonly called a clutch fork.

At its free end, the hub 13 is wedged in terms of rotation on the shaft 22 by means of a splined fitting of conventional type.

In the example illustrated, the clutch release bearing 24 is mounted so as to slide on a centering sleeve 26, commonly called a flared tube, carried by the housing 27 of the gear box 23. The clutch fork 25 is mounted pivotally at 21 on a housing cap 28 likewise integral with the housing 27 of the gear box 23 and intended to be fixed to a housing body 29 surrounding the clutch.

The clutch release bearing 24 incorporates, by means of a bearing 30, an engagement element 31 via which it is designed to act by traction on the diaphragm 19, according to the arrow F1, towards the rear, that is to say to the right in FIG. 1.

A coupling member 32 (FIG. 2), such as a substantially frustoconical split ring, has an inner periphery which is edged with a radial angled portion 33, by means of which this ring is centered in the engagement element 31 of the clutch release bearing 24. For this purpose, this engagement element 31 has a groove 34 in the vicinity of its free end. Furthermore, the split ring 32 is divided on its outer periphery into elastically deformable lugs 35.

In the engaged configuration illustrated in FIGS. 1 and 2, these elastically deformable lugs 35 project radially relative to the engagement element 31 and are in contact against a shoulder 36 of a piece 40 of generally annular shape which is called a gripping piece 40.

The gripping piece 40 interacts with the diaphragm 19 and possesses radially, on the side of the diaphragm 19 opposite to the clutch release bearing 24, a bearing collar 41 for acting on the diaphragm 19 at 60 (FIG. 2).

The coupling member 32 thus constitutes a means of fixing in terms of traction, which, being provided axially between the clutch release bearing 24 and the gripping piece 40, is designed to make an axial connection between the gripping piece 40 and the engagement element 31 of the clutch release bearing 24 in the axial direction extending from the front towards the rear, that is to say from left to right in FIGS. 1 and 2, that is extending from the diaphragm 19 to the clutch release bearing 24.

Moreover, elastic retention means 50, 51 are located on the same side as the clutch release bearing 24 and stress the bearing collar 41 of the gripping piece 40 so that it is permanently in contact with the diaphragm 19.

The elastic retention means 50, 51 comprise an elastic washer 50, the cross-section of which has a twisted shape (FIG. 2). The washer 50 incorporates a first annular bearing surface 52 bearing on the diaphragm 19 and a second annular bearing surface 53 bearing against an annular groove 54 of the gripping piece 40 and more particularly against the rear face 54A, forming a shoulder, of this groove 54. Alternatively, the piece 40 could simply have the shoulder 54A, the groove 54 being omitted.

The elastic washer 50 has between the bearing surfaces 52 and 53 a bent zone 55 having a first part 55A adjacent to the first bearing surface 52 and inclined towards the axis and towards the rear, that is to say towards the bottom and towards the right in FIG. 2, this part 55A constituting the essentially elastic element, and a second part 55B of greater rigidity which is adjacent to the second bearing surface 53 and which is deflected towards the axis and towards the front, that is to say towards the bottom and to the left in FIG. 2, in order to reduce the bulk.

This part 55B preferably has an incurved form in order to pass conveniently round the diaphragm 19, whilst ensuring as reduced a bulk as possible. The incurved form of part 55B allows the diaphragm 19 to rock freely during clutch operation.

As can be seen more particularly in FIG. 2, the annular bearing surfaces 52 and 53 are substantially coplanar in a plane perpendicular to the axis.

It will also be noted in FIG. 2 that the elastic washer 50 has, on the outside of the first bearing surface 52, a third part 56 which is peripheral and which is inclined outwards and towards the rear, that is to say upwards and to the right in FIG. 2.

In the embodiment illustrated (FIGS. 2 and 3), the washer 50 consists of a circlip split at 57 and possessing on either side of this slit 57 two holes 58 to make it easier to install the circlip for the purpose of ensuring particularly convenient assembly.

The elastic retention means 50, 51 also comprise an elastic counter-washer 51 which bears in a groove 59 of the engagement element 31 of the clutch release bearing 24 and which exerts a forward pressure, that is to say towards the left in FIG. 2, on the washer 50 at the level of the bearing surface 52 which bears on the diaphragm 19. The counter-washer 51 makes it possible, in combination with the washer 50 and together with a greatly reduced bulk, to ensure permanent contact, on the one hand, at 60 between the collar 41 of the gripping piece and the diaphragm 19 and, on the other hand, at 36-35 between the pieces 40 and 32, whilst ensuring a very compact construction and without any risks during operation. It will be noted that the counter-washer 51 is notched at 51A to make it easier for it to engage in the groove 59. It will also be understood that the counter-washer 51 is generally inclined towards the axis and towards the rear, being slightly deflected towards the front in the vicinity of the groove 59 so as to reduce the bulk.

Moreover, the outer end on the counter-washer 51 finds a concave stable bearing support at the level of the bearing surface 52 between the parts 55A and 56 forming a V.

When there is no action on the fork 25, the clutch occupies the engaged position shown in FIGS. 1 and 2, in which the friction disc 15 is clamped between the plates 14 and 16 under the action of the Belleville washer 17.

When a rocking action is exerted on the clutch fork 25, which pivots about its pivot pin 21, according to the arrow F2 in FIG. 1 for the purpose of releasing the clutch, the clutch release bearing 24 is driven axially according to the arrow F1 by the clutch fork 25 and, by means of the coupling member 23 which it carries, in turn drives the gripping piece 40 towards the right in FIG. 2. The collar 41 of this gripping piece 40 acts at 60 on the end of the fingers 20 of the diaphragm 19 towards the right in FIG. 2, thus deforming the diaphragm 19 and stopping the clamping action of the Belleville washer 17 on the plate 16 and the friction disc 15.

Because elastic means 50, 51 are arranged according to the invention, these comprising an elastic washer 50, the cross-section of which has a twisted shape, in combination with the action of the counter-washer 51 at the level of the bearing surface 52 bearing on the diaphragm 19, there is the advantage not only of a saving in terms of bulk, but also permanent contact at 60 between the collar 41 of the gripping piece 40 and the diaphragm 19, thus ensuring faultless operation whatever the state of wear of the assembly as a whole.

It will be appreciated, more particularly, that the construction is extremely compact because of the twisted shape of the cross-section of the washer 50, thus allowing a substantially reduced bulk especially in an axial direction. Moreover, this results in low inertia. It will also be noted that the device according to the invention can be assembled very conveniently under excellent conditions. In particular, the configuration of the washer 50 in the form of a split circlip allows very easy assembly and permanent contact at 60, ensuring prepositioning of the piece 40 at the time when the pieces 31 and 40 are assembled, thus making it easier to assemble them.

It will be understood especially that the provision of the bearing surfaces 52 and 53 in a substantially coplanar arrangement contributes to making the production conditions easier and also results in very compact construction appropriate for achieving excellent performances in terms of elasticity for the washer 50 and the counterwasher 51.

The invention is not limited to the embodiment described and illustrated, but embraces all alternative forms as regards the design of its various elements and its uses, within the scope of the claims. In particular, the counter-washer 51 could be extended outwards with a bent-over end intended for capping the outer end of the part 56 of the circlip 50, to prevent even more effectively the risk that the latter will open inopportunely.

I claim:

1. A clutch release bearing assembly including a pull-type clutch release bearing and mounting means for attaching said release bearing to a clutch disengaging device, said mounting means comprising a gripping member having a bearing collar adapted to be arranged on one side of the disengaging device axially remote from said clutch release bearing, fixing means disposed radially between said clutch release bearing and said gripping member for providing an axial connection between said gripping member and said clutch release bearing in the clutch release direction, and elastic retention means located axially on the same said side of the disengaging device as said clutch release bearing constantly biasing said bearing collar for contact with said disengagement device, said elastic retention means comprising at least one elastic washer of wavy cross section, including a first annular bearing surface for bearing on the disengaging device and a second annular bearing surface for bearing against said gripping member, and a curved zone between said first and second annular bearing surfaces including a first part adjacent said first bearing surface and inclined towards said clutch release bearing and a second part adjacent said second bearing surface and inflected towards the axis and away from said clutch release bearing, thereby reducing the axial extent of the bearing assembly.

2. The release bearing assembly of claim 1, wherein said second part which is inflected radially and away from said release bearing comprises a double curve.

3. The release bearing assembly of claim 1, wherein said annular bearing surfaces are substantially coplanar and lie in a substantialy radial plane.

4. The release bearing assembly of claim 1, wherein said elastic washer comprises a split spring washer.

5. The clutch release bearing assembly of claim 1, wherein the portion of said elastic washer including said second bearing surface is received in a groove in said gripping member.

6. The clutch release assembly of claim 1 wherein said elastic washer is of flattened S-shaped configuration in radial cross section.

7. The release bearing assembly of claim 1, wherein said elastic means further comprises an elastic counter-washer bearing against said clutch release bearing and exerting an axial force against said elastic washer adjacent said first bearing surface for urging said elastic washer towards the disengagement device.

8. The release bearing assembly of claim 7, wherein a radially inner edge of said elastic counterwasher is received in a groove of said clutch release bearing.

9. The clutch release assembly of claim 8, wherein the portion of said elastic washer including said second bearing surface is received in a groove in said gripping member.

* * * * *